US011025514B2

(12) United States Patent
Tiagi et al.

(10) Patent No.: US 11,025,514 B2
(45) Date of Patent: Jun. 1, 2021

(54) AUTOMATIC HEALTH CHECK AND PERFORMANCE MONITORING FOR APPLICATIONS AND PROTOCOLS USING DEEP PACKET INSPECTION IN A DATACENTER

(71) Applicant: Nicira, Inc., Palo Alto, CA (US)

(72) Inventors: Alok S. Tiagi, Sunnyvale, CA (US); Jayant Jain, Cupertino, CA (US); Anirban Sengupta, Saratoga, CA (US); Srinivas Nimmagadda, San Jose, CA (US); Rick Lund, Livermore, CA (US)

(73) Assignee: NICIRA, INC., Palo Alto, CA (US)

( * ) Notice: Subject to any disclaimer, the term of this patent is extended or adjusted under 35 U.S.C. 154(b) by 1007 days.

(21) Appl. No.: 14/994,661

(22) Filed: Jan. 13, 2016

(65) Prior Publication Data

US 2017/0126516 A1    May 4, 2017

Related U.S. Application Data

(60) Provisional application No. 62/248,540, filed on Oct. 30, 2015.

(51) Int. Cl.
*H04L 12/26* (2006.01)
*H04L 29/08* (2006.01)
*H04L 29/06* (2006.01)
*H04L 12/24* (2006.01)

(52) U.S. Cl.
CPC ............ *H04L 43/04* (2013.01); *H04L 67/02* (2013.01); *H04L 67/1002* (2013.01); *H04L 69/22* (2013.01); *H04L 41/5009* (2013.01)

(58) Field of Classification Search
CPC ..... H04L 41/0896; H04L 43/08; H04L 47/10; H04L 47/20
See application file for complete search history.

(56) References Cited

U.S. PATENT DOCUMENTS

| 8,995,459 | B1 | 3/2015 | Bharghavan et al. |
| 9,264,313 | B1 | 2/2016 | Manuguri et al. |
| 9,686,192 | B2 | 6/2017 | Sengupta et al. |
| 2006/0233101 | A1* | 10/2006 | Luft ................... H04L 41/0896 370/229 |
| 2011/0194563 | A1* | 8/2011 | Shen ................... G06F 9/45558 370/395.52 |

(Continued)

OTHER PUBLICATIONS

Author Unknown, "ManageEngine: NetFlow Analyzer," Month Unknown 2018, 3 pages, ZohoCorp, retrieved at https://www.manageengine.com/products/netflow/.

(Continued)

*Primary Examiner* — Philip J Chea
*Assistant Examiner* — Mohammed Ahmed
(74) *Attorney, Agent, or Firm* — Adeli LLP

(57) ABSTRACT

A method of collecting health check metrics for a network is provided. The method, at a deep packet inspector on a physical host in a datacenter, receives a copy of a network packet from a load balancer. The packet includes a plurality of layers. Each layer corresponds to a communication protocol in a plurality of communication protocols. The method identifies an application referenced in the packet. The method analyzes the information in one or more layers of the packet to determine metrics for the source application. The method sends the determined metrics to the load balancer.

18 Claims, 15 Drawing Sheets

(56) References Cited

U.S. PATENT DOCUMENTS

| | | | |
|---|---|---|---|
| 2012/0041965 A1* | 2/2012 | Vasquez | H04L 43/028 707/758 |
| 2012/0155255 A1* | 6/2012 | Gerber | H04L 41/0896 370/230 |
| 2013/0198319 A1 | 8/2013 | Shen et al. | |
| 2013/0297802 A1* | 11/2013 | Laribi | H04L 12/6418 709/226 |
| 2014/0059544 A1 | 2/2014 | Koganty et al. | |
| 2014/0226478 A1* | 8/2014 | Manuguri | H04L 47/12 370/235 |
| 2015/0085695 A1 | 3/2015 | Ryckbosch et al. | |
| 2015/0089331 A1* | 3/2015 | Skerry | G06F 9/45533 714/799 |

OTHER PUBLICATIONS

Author Unknown, "NBAR Monitor: Analyze, Recognize and Classify Real Time Application Traffic using NBAR," ManageEngine—NetFlow Analyzer, Month Unknown 2018, 2 pages, Zoho Corp, retrieved at https://www.manageengine.com/products/netflow/nbar-monitor.html.

Hetland, Steve, "AppDynamics End User Experience," AppDynamics Pro 3.8 Documentation, Mar. 7, 2014, 2 pages, AppDynamics LLC, retrieved at https://docs.appdynamics.com/display/PRO14S/AppDynamics+End+User+Experience.

Ohlhorst, Frank, "Review: Deep Packet Inspection Comes to Solarwinds NPM," Sep. 16, 2014, 6 page, retrieved at http://www.enterprisenetworkingplanet.com/netsysm/review-deep-packet-inspection-comes-to-solarwinds-npm.html.

* cited by examiner

AUTOMATIC HEALTH CHECK AND PERFORMANCE MONITORING FOR APPLICATIONS AND PROTOCOLS USING DEEP PACKET INSPECTION IN A DATACENTER

CLAIM OF BENEFIT TO PRIOR APPLICATIONS

This application claims the benefit of U.S. Provisional Patent Application 62/248,540, filed Oct. 30, 2015. U.S. Provisional Patent Application 62/248,540 is incorporated herein by reference.

BACKGROUND

In a datacenter an operator gets a view of how the resources such as storage, network, and processors are performing by the feedback received from network infrastructure, compute nodes, and storage nodes. This feedback is helpful for checking performance and detecting hot areas in the datacenter and implementing ways to ensure a balanced use of resources.

Similarly it is important to monitor metrics for applications that run in the datacenter. At the application level it is not only the datacenter operator who is interested in the metrics, but it can be people from program management, analytics, or development fields. Thus an even richer set of metrics is required which can be, for example, related to application user experience, frequency of reads and writes to the database, and application availability statistics.

To collect these metrics it may be required to query different resources such as storage nodes, compute nodes, edge servers, or the network infrastructure. Sometimes it may be necessary to introduce additional changes to the application code, or deploy or reserve compute resources to collect these metrics. In the case of a distributed application such as a clustered database, collecting metrics from these individual resources may not give a complete picture as to how the application is performing within different areas of a datacenter or across the datacenters. Additionally the metrics can be stale since they are queried at intervals and may not provide a real time picture.

Typically the only scripted health checks that are done are at the HTTP level by the load balancers and the servers are marked up or down based on the health check results. No obvious insight is available for the inner tiered application performance or outages, which could be making the outside HTTP health check fail intermittently. If the inner tier application level health checks are required, these actions for performing the health check has to be specifically scripted for each application at the application load balancer. Alternatively, specific agents need to be installed in each application whose output is then fed out of band into the load balancer for determining the availability and performance.

Some of the current solutions require code injection into the application to collect various application level health and performance metrics. For instance in a solution for web applications, code is injected into the webpage source code. Similarly the source code of mobile applications is modified to start statistics collections. Controllers are required to collect these statistics. In case of database metrics, additional resources have to be reserved and installed to run agents that connect to different types of databases and collect performance and health information from them. Again as the number of databases required to be monitored increases additional licenses are required for the agents.

Other solutions require code instrumentation, e.g., in a Java application to monitor the application and collect metrics. To monitor databases, an agent is required that can connect to a database server. The agents are required for any other specific applications that require monitoring. The above approaches result in additional configurations and maintenance.

BRIEF SUMMARY

Some embodiments utilize the network traffic to inspect packets payload to collect application metrics. The traffic to and from applications running on virtual machines is analyzed by using deep packet inspection. Deep packet inspection can go beyond different layer headers and detect the application referenced in the packet and extract additional metadata for the application. Network packets that carry database operations such as reads and writes requested by an application are detected and are used, for example, to calculate the number of database operations done by the application.

In band auto discovery of applications and protocols and automatic health checks for these applications and protocols are performed by detecting the protocol being transacted. In some embodiments, a deep packet inspection engine runs in each host of the datacenter. The deep packet engine receives a set of packets from a load balancer and provides an automatic application discovery and health monitoring service. The deep packet engine analyzes the received packet traffic and collects application metrics. The application metrics is then provided to the load balancer to act upon. In order to provide automatic application health and performance, there is no need to connect to any resource and does not require additional configurations for monitoring. Instead the required information is taken from the user traffic in the network. In addition, the deep packet inspection mechanism is provided in the hosts within a datacenter and there is no need for an external application to connect to the virtual machines or databases.

The preceding Summary is intended to serve as a brief introduction to some embodiments of the invention. It is not meant to be an introduction or overview of all of the inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION OF THE INVENTION

In the following detailed description of the invention, numerous details, examples, and embodiments of the invention are set forth and described. However, it should be understood that the invention is not limited to the embodiments set forth and that the invention may be practiced without some of the specific details and examples discussed.

Figure 1:
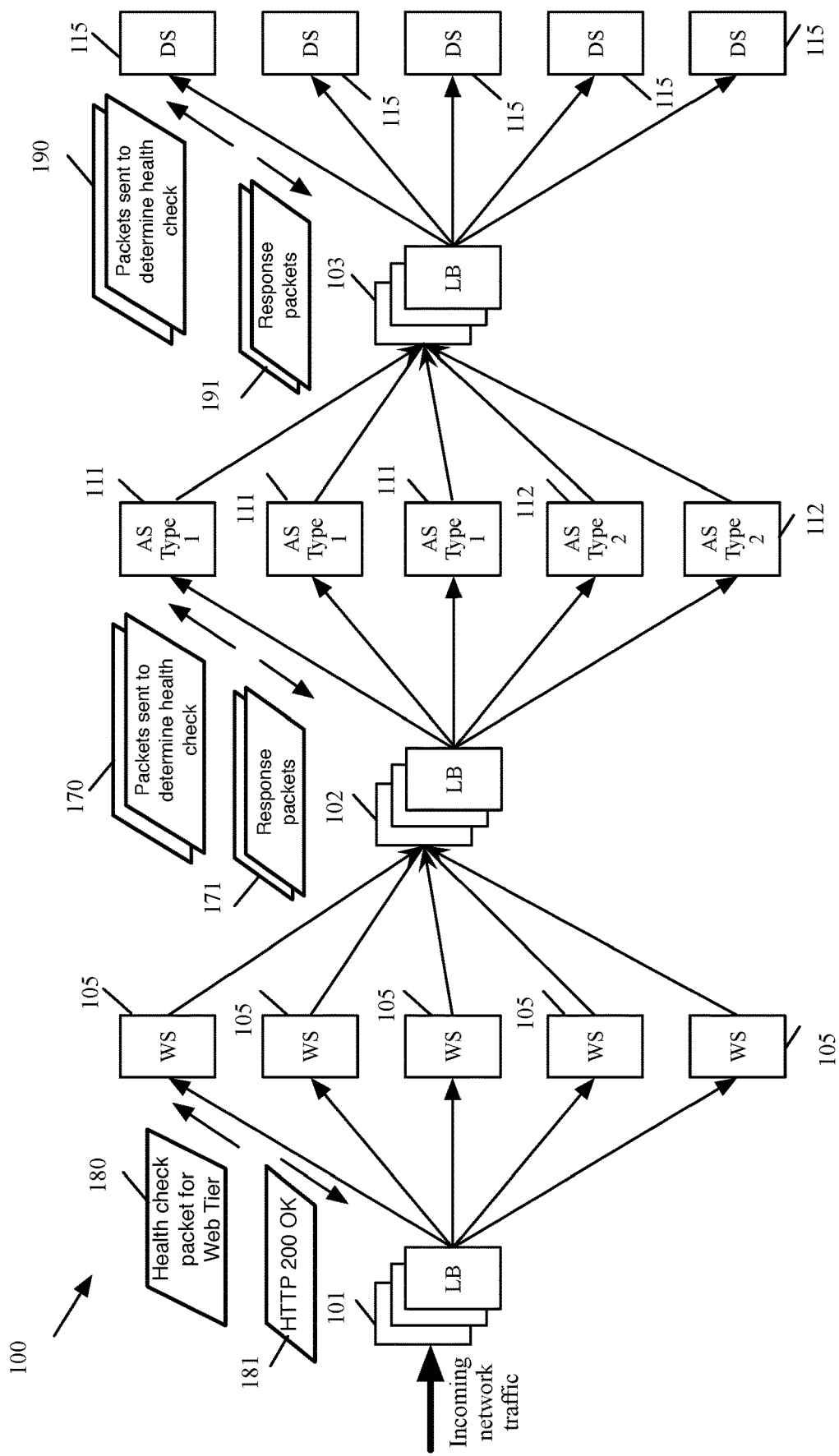
FIG. 1 illustrates a load balancer health check deployment according to prior art.

Load balancers are commonly used in datacenters to spread the traffic load to a number of available computing resources that can handle a particular type of traffic. FIG. 1 illustrates a load balancer health check deployment according to prior art. As shown, the load balancers 101-103 are topologically deployed at the edge of the network 100 and between different types of virtual machines (VMs). For example, load balancers 101 are deployed at the edge of the network, load balancers 102 are deployed between webservers 105 and application servers 111-112, and load balancers 103 are deployed between application servers 111-112 and the database servers 115. The load balancers 101-103 are in some deployments standalone machines that perform load balancing functions. Also, in some deployments, the load balancers are service VMs that execute on the same host computing devices that execute the different layers of servers that have their traffic balanced by the load balancers.

The load balancers 101-103 include application-aware scripts that are written with functional knowledge of the servers that are load balanced by the load balancers. The scripts send packets to generate similar connections and responses as the expected workload. For instance, the set of load balancers 101 are configured to include health check scripts for webservers. The scripts send packets 180 to webservers 105. The webservers reply with a health status 181 such as an HTTP 200 OK message that indicates the webserver has received and successfully performed the request. For instance, a packet 180 can include a TRACE request and the response 181 from the webserver can include (1) the request packet as received by the webserver and (2) the HTTP 200 OK status indicating that the request is successfully performed. The load balancers 101 determine the health of the webserver based on the content of the response (or the lack of any response).

Similarly, the load balancers 102 are configured to include health check scripts for application servers. The scripts send packets 170 that request a predetermined set of actions from an application server and the load balancers 102 determine the health of the corresponding application servers based on the responses 171. In the example of FIG. 1, there are two types of application servers: application server type 1 111 and application server type 2 112. The load balancers include scripts that generate requests that are appropriate for each type of application server.

The load balancers 103 are also configured to include health check scripts for database servers 115. The scripts send packets 190 that request a predetermined set of actions from a database server and the load balancers 103 determine the health of the corresponding database servers based on the responses 191. For instance, the script is written to send a packet to request that a particular table in the database server to be accessed. The script also compares the response received from the database server with an expected result to determine the health status of the database server.

Figure 2:
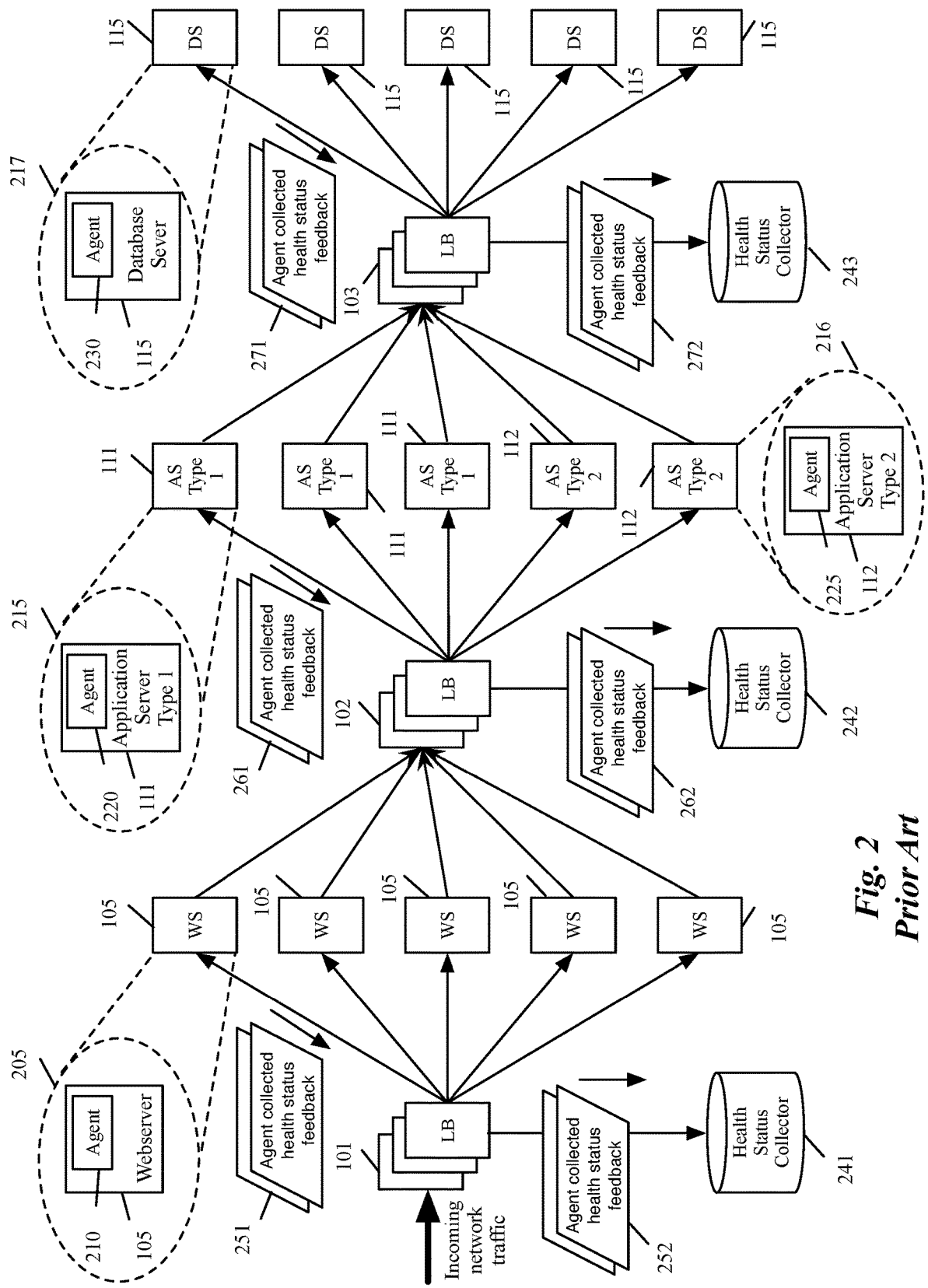
FIG. 2 illustrates an alternative load balancer health check deployment according to prior art.

FIG. 2 illustrates an alternative load balancer health check deployment according to prior art. In this type of deployment, each server includes code in the form of an agent for collecting health status. As shown in the expanded view 205, each webserver 105 includes an agent 210 that collects information from the webserver 105 and sends (either directly or through the load balancers 101) the collected health status feedback 251 to a set of health status collectors 241.

Similarly, as shown by expanded views 215-217, application servers 111, application servers 112, and database servers 115 include agents 220, 225, and 230, respectively. Each agent includes customized code that has knowledge of different functionalities of the corresponding server. Each agent collects health check data and sends to the health status collectors 242-243.

The difference between the health check mechanisms of FIGS. 1 and 2 is the followings. In the system of FIG. 1, the health check status is collected in the form of a series of request and responses. The requests are initiated by the load balancers (e.g., by using scripts written for collecting health check status) and the responses (or the lack of responses) are used to determine the servers' health status. In contrast, the system in FIG. 2 uses agents that are included in the servers. The agents collect health check status (without a request from the load balancers) and send the collected status to the health status collectors.

I. Auto Discovery and Health Check using Deep Packet Inspection

Some embodiments provide an auto discovery and health check by using deep packet inspection (DPI). The packets communicated in the network are inspected to perform auto discovery and health check. Some embodiments also store a selected number of packets and reuse them to perform health check when the network is idle.

A. Performing DPI for Load Balancers

Figure 3:
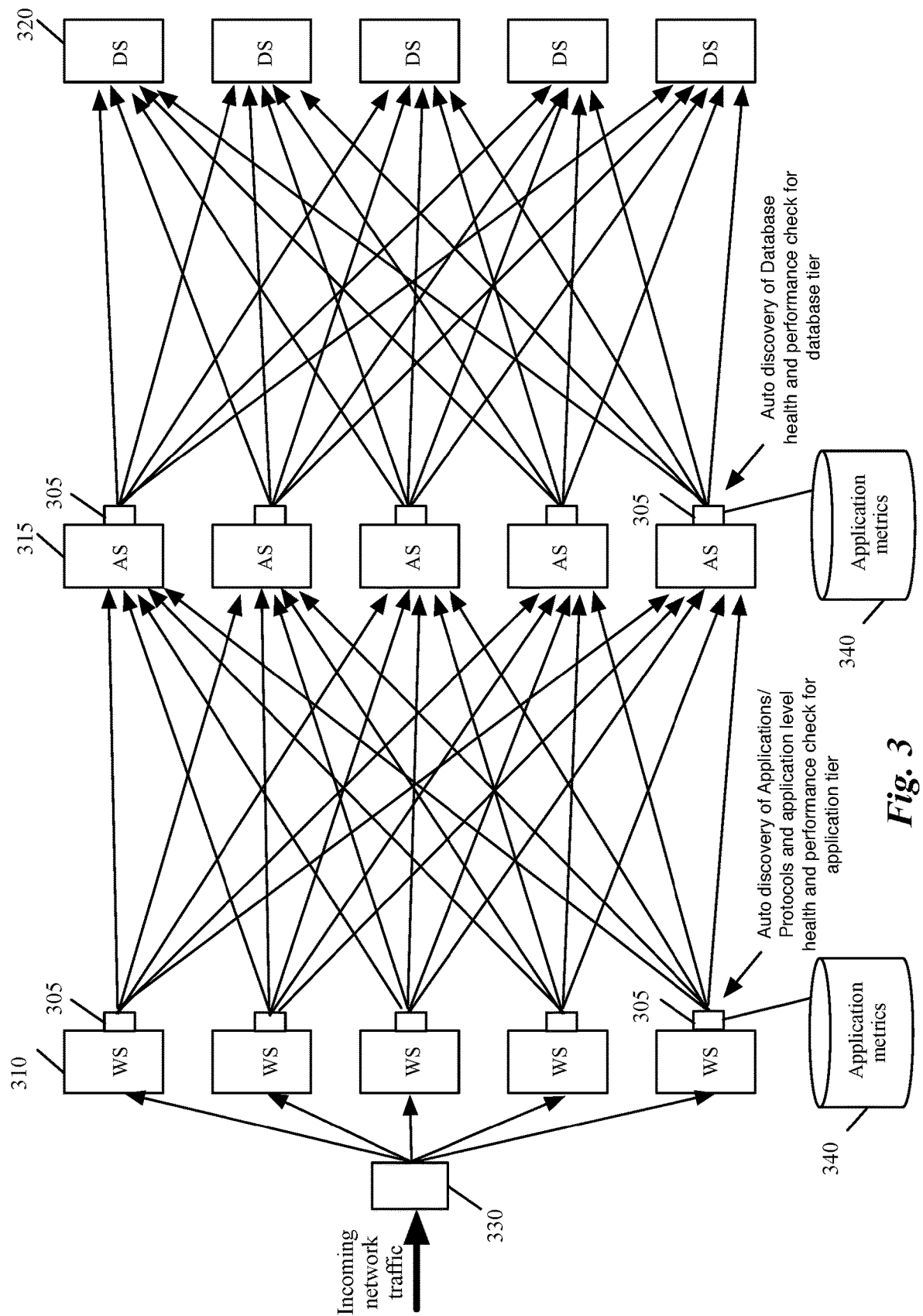
FIG. 3 conceptually illustrates a DPI based load balancer system with in-band auto discovery and health check in some embodiments.

FIG. 3 conceptually illustrates a DPI based load balancer system with in-band auto discovery and health check in some embodiments. Auto discovery includes detecting the presence of different applications, the applications locations, the use of different protocols, etc., by inspecting the network traffic. The architecture shown in the figure employs an inline load-balancing method that deploys a load balancer 305 in the egress data path of each of several compute nodes. The compute nodes in this example fall into three groups of servers, which are webservers 310, application servers 315, and database servers 320. In some embodiments, the three groups of servers are three-tiers of servers that are commonly found in a datacenter.

As shown, a load balancer 305 is placed at the output of each web or application server in this example such that webserver data traffic to the application servers is load balanced, and the application server data traffic to the database servers is load balanced. Each load balancer enforces the load balancing rules needed to spread the data traffic that is sent from the load balancer's corresponding source compute node (e.g., source servers) to multiple destination compute nodes (e.g., destination servers) that are part of one destination compute node group. In some embodiments, a set of load balancers 330 is also placed at the edge of the network to load balance the incoming network traffic.

In some embodiments, some or all of the source and destination compute nodes are VMs that executes on one or more hosts, and some or all of the load balancers are other software modules that execute on the same hosts as their source compute nodes. A VM is a software implementation of a machine such as a computer. A host is a physical machine that hosts VMs or other data compute nodes for one or more tenants. A host in some embodiments includes virtualization software (e.g., a hypervisor, virtual machine monitor, etc.), which is a software abstraction layer that operates on top of the hardware and below any operating system.

As described further below, the host of each webserver 310, application server 315, or database server 320 includes a DPI engine. Each host may host more than one server or more than one type of server. Each load balancer 305 sends a selected number of packets to the DPI engine on the host. The DPI engine inspects the packets, collects health status and statistics, and provides the data to the load balancer. Each load balancer 305 stores the collected health status in an application metrics data structure 340 (e.g., a table or a database).

Figure 4:
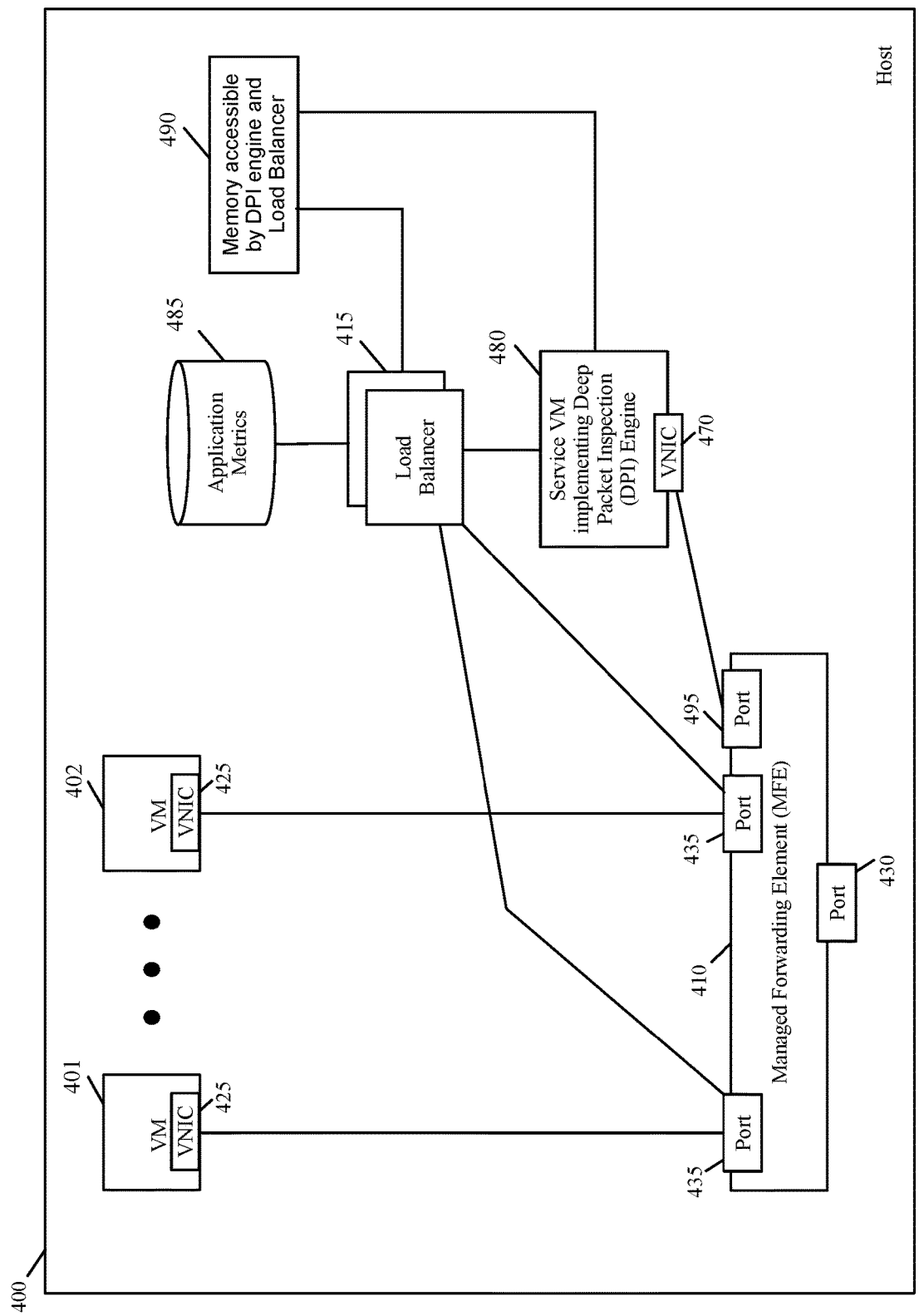
FIG. 4 conceptually illustrates a host that implements auto discovery and health check using DPI in some embodiments.

FIG. 4 conceptually illustrates a host 400 that implements auto discovery and health check using DPI in some embodiments. As shown, the host 400 is hosting several VMs 401-402. Each VM can implement a server such as any of the webservers 310, application servers 315, or database servers 320 shown in FIG. 3. The host also includes a managed forwarding element (MFE) 410, a set of one or more load balancers 415, and a deep packet inspection (DPI) engine (or deep packet inspector) 480.

The MFE executes on the host to communicatively couple the VMs of the host to each other and to other devices outside of the host (e.g., other VMs on other hosts) through one or more forwarding elements (e.g., switches and/or routers) that operate outside of the host. As shown, MFE 410 includes a port 430 to connect to a physical network interface card (not shown) of the host, and one or more ports 435 to connect to the virtual network interface card (VNIC) 425 of each VM. In some embodiments, the VNICs are software abstractions of the physical network interface card (PNIC) that are implemented by the virtualization software of the host. Each VNIC is responsible for exchanging data messages between its VM and the MFE 410 through its corresponding MFE port. As shown, a VM's egress data path for its data messages includes (1) the VM's VNIC 425, (2) the MFE port 435 that connects to this VNIC, (3) the MFE 410, and (4) the MFE port 430 that connects to the host's PNIC.

Through its port 430 and a NIC driver (not shown), the MFE 410 connects to the host's PNIC to send outgoing packets and to receive incoming packets. The MFE 410 forwards messages that it receives on one of its ports to another one of its ports. In some embodiments, the MFE 410 is a software switch, while in other embodiments it is a software router or a combined software switch/router.

The MFE ports 435 in some embodiments include one or more function calls to one or more modules that implement special input/output (I/O) operations on incoming and outgoing packets that are received at the ports. One of these function calls for a port is to a load balancer in the load balancer set 415. In some embodiments, the load balancer performs the load balancing operations on outgoing data messages that are addressed to destination compute node groups whose input traffic is being spread among the compute nodes in the group in order to reduce the load on any one compute node. For the embodiments illustrated by FIG. 4, each port 435 has its own load balancer 415. In other embodiments, some or all of the ports 435 share the same load balancer 415 (e.g., all the ports share one load balancer, or all ports that are part of the same logical network share one load balancer).

Each load balancer 415 sends a copy of a subset of the packets the load balancer receives to the DPI engine 480. For instance, the load balancer may send a copy the first n packets of a stream (or session) to the DPI engine for further processing and inspection. The DPI engine inspects the packets, extracts metrics, and provides the metrics to the load balancer. In some embodiments, each load balancer in a host has a corresponding DPI engine. In other embodiments, some or all load balancers in a host utilize the same DPI engine.

The DPI engine 480 in the embodiment shown in FIG. 4 is implemented on a service VM running in the host. Different embodiments forward the packets from a load balancer to the service VM and receive metrics at the load balancer from the service VM differently. For instance, in some embodiments, the service VM 480 and the corresponding load balancer(s) have access to a common memory. As shown, load balancer 415 and service VM 480 have access to memory 490. In these embodiments, the load balancer places the packets that are copied to the service VM in memory 490 and the service VM accesses the packets from memory 490. Similarly, the service VM places the collected metrics in memory 490 and the load balancer accesses the metrics from memory 490.

In other embodiments, the load balancer encapsulates the packets with an overlay network header and sends the encapsulated packet through the MFE 410 to the service VM's VNIC 470 through an overlay network. Since the service VM is on the same host as the load balancer, the packets do not leave the host and are delivered to the service VM by the MFE through an overlay tunnel in the host. An overlay network is a network virtualization technology that achieves multi-tenancy in a computing environment. Examples of overlay networks include Virtual eXtensible LAN (VXLAN), Generic Network Virtualization Encapsulation (GENEVE), and Network Virtualization using Generic Routing Encapsulation (NVGRE). For instance, VXLAN is a Layer 2 (L2) overlay scheme over a Layer 3 (L3) network. VXLAN encapsulates an Ethernet L2 frame in IP (MAC-in-UDP encapsulation) and allows VMs to be a part of virtualized L2 subnets operating in separate physical L3 networks. Similarly, NVGRE uses Generic Routing Encapsulation (GRE) to tunnel L2 packets over L3 networks.

In alternative embodiments, the DPI engine is implemented as a process that runs on the host operating system. These embodiments remove the overhead of using a service VM, as the DPI engine process can interact with other processes in the host, e.g., through the control plane. In these embodiments, the DPI engine process also communicates with the load balancer through the MFE or a common memory that is accessible by both the load balancer and the DPI engine.

Figure 5:
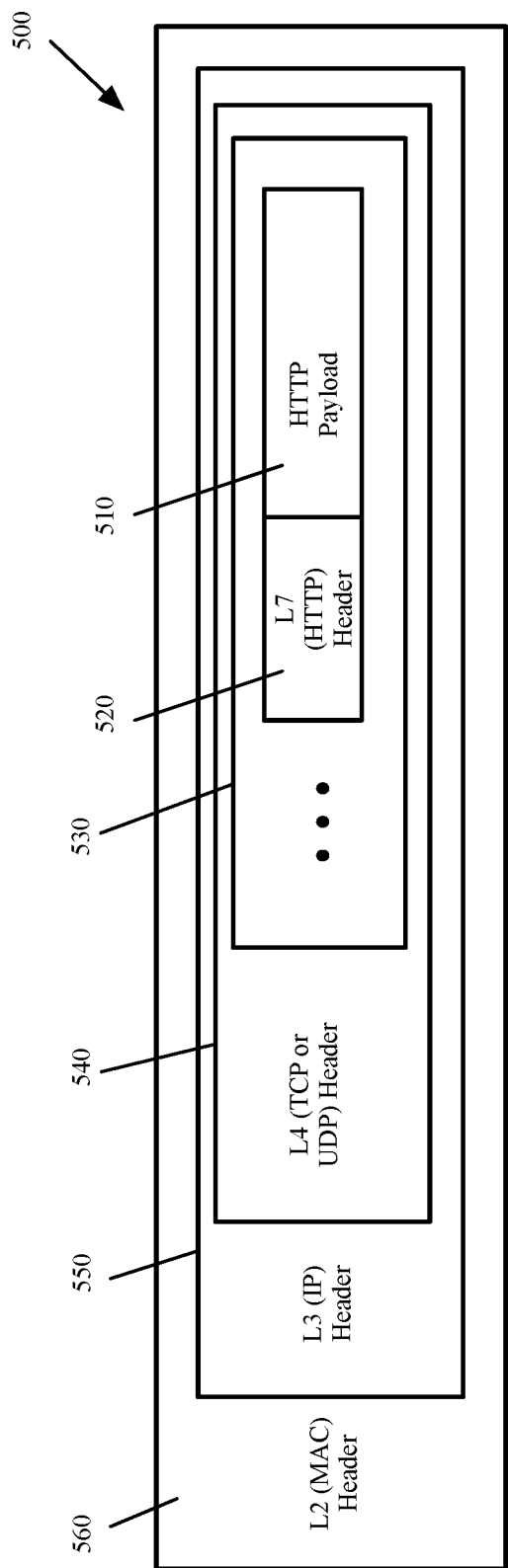
FIG. 5 conceptually illustrates the structure of a packet in some embodiments.

B. Examples of the Metrics and Alerts Provided by DPI Engine for a Particular Protocol FIG. 5 conceptually illustrates the structure of a packet in some embodiments. The Example of FIG. 5 shows a packet 500 that is generated according to Open Systems Interconnection (OSI) model. As shown, the packet includes data for multiple abstraction layers. The OSI Layer 2 (or data link layer) header 560 in this example includes media access control (MAC) addresses of the source and the next hop destination for the packet. Layer 2 encapsulates Layer 3 (or network layer) 550, which in this example uses Internet protocol (IP). Layer 3 encapsulates Layer 4 (or transport layer) 540, which in this example uses either the transmission control protocol (TCP) or user datagram protocol (UDP).

The inner layers of the packet include data 530 that relates to other OSI layers and protocols such as secure sockets layer (SSL), structured query language (SQL), hypertext markup language (HTML), etc. In this example, the innermost layer includes Layer 7 (or application layer) that includes hypertext transfer protocol (HTTP) header 520 and the HTTP payload 510. In the embodiments that implement an overlay network, packet 500 is further encapsulated by outer layers for the overlay tunnel L2 and L3 addresses and additional information such as VLAN type, Ether type, etc., which are not shown in FIG. 5 for simplicity.

The DPI engine 480 in some embodiments parses and analyzes different layers of a packet (such as packet 500) and prepares metrics related to different protocols in the packet as well as metrics regarding the source and the destination of the packet. It should be understood that OSI model is one example of abstracting a network in different layers. Other network models such as the four layer TCP/IP model can readily be analyzed by the DPI engine of the disclosed embodiments. For instance, in the TCP/IP model, the network access layer provides the same functionality as the first three layers of the OSI model. The Internet layer of the TCP/IP model provides the same functionality as the network layer of the OSI model. The transport layer of the TCP/IP model provides the same functionality as the transport layer of the OSI model and the application layer of the TCP/IP model provides the same functionality as the OSI layers (such as the OSI application layer) that are above Layer 4.

Figure 6A:
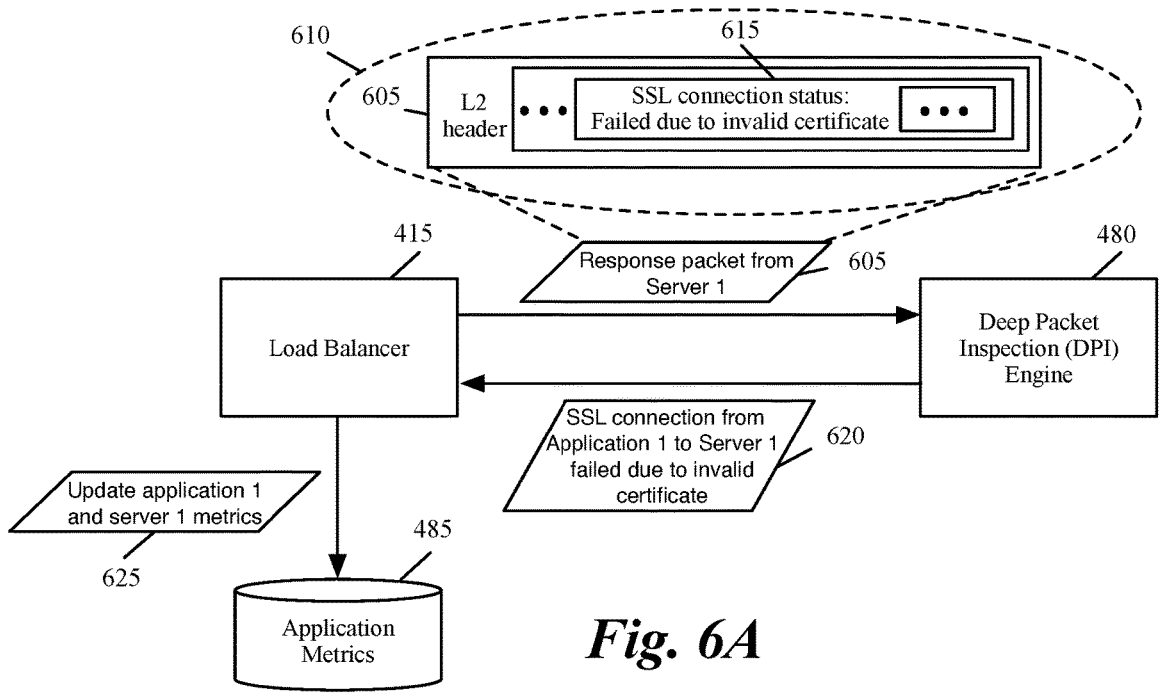
FIGS. 6A and 6B conceptually illustrate an example of the metrics provided by the DPI engine to the load balancer and the load balancer actions on the metrics in some embodiments.
Figure 6B:
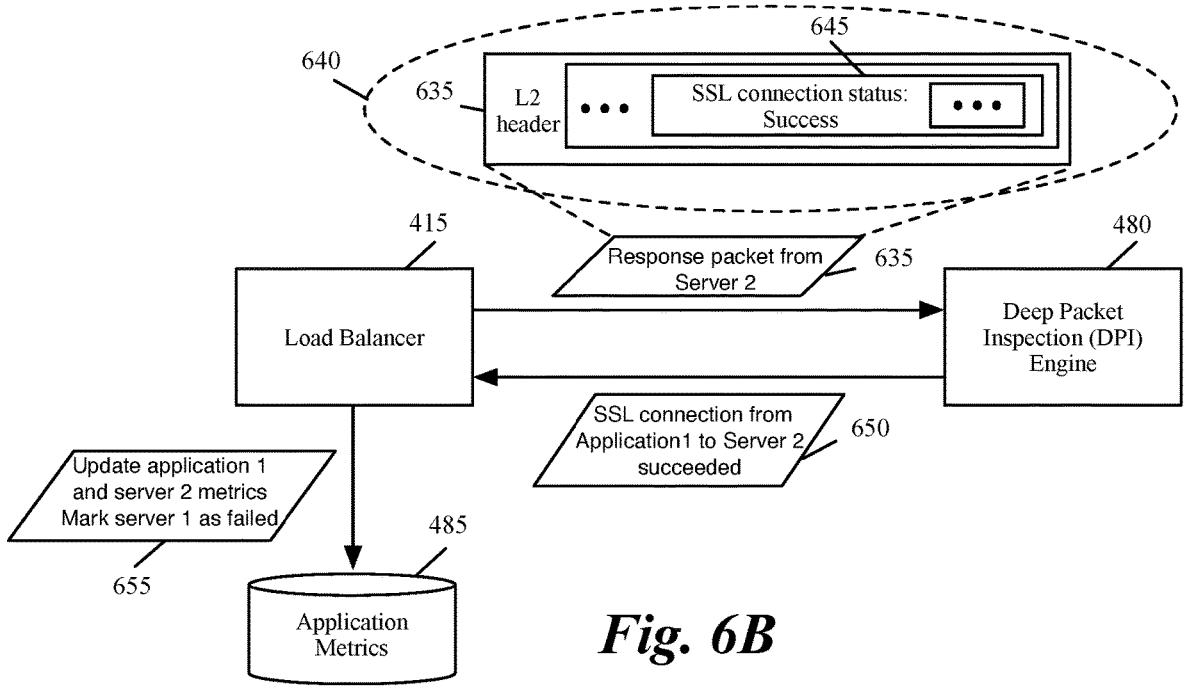

FIGS. 6A and 6B conceptually illustrate an example of the metrics provided by the DPI engine to the load balancer and the load balancer actions on the metrics in some embodiments. As shown in FIG. 6A, the load balancer 415 sends a copy of a packet 605 to the DPI engine 480. The packet in this example is a response that server 1 has sent in response to a request by application 1. For instance, server 1 is a backend server to which application 1 is attempting to connect. As shown in the expanded view 610, the packet 605 includes an SSL connection status code 615 that indicates the connection has failed due to invalid certificate.

The DPI engine 480 parses packets sent to it by the load balancer and automatically discovers different protocols used in different layers of the packet. The DPI engine also identifies the source and destination of the packet and provides different metrics for the source, destination, and the protocols used in the packet.

In this example, the DPI engine may provide additional metrics based on different parts of the packet other than the SSL connection code. For simplicity, the example of FIGS. 6A and 6B only shows the metrics provided by the DPI engine for the SSL connection. DPI engine 480 provides a feedback 620 to load balancer 415 that indicates (among others provided metrics) that the connection to server 1 has failed to establish due to an invalid certificate.

Load balancer 415 receives the feedback 620 and performs different actions based on the provided metric. For instance, the load balancer updates (as shown by 625) the metrics for application 1 and server 1 in the application metrics storage 485. In addition, if server 1 is part of a pool of redundant servers that provide the same service, the load balancer may mark server 1 as failed and forward future requests directed to server 1 to another server in the pool. In this example, however, the load balancer does not mark server 1 as failed and waits for further metrics from the DPI engine.

In the example of FIG. 6A, the DPI inspection provides the feedback for invalid certificate of server 1 to the load balancer by examining the information included in the packet beyond Layer 4. In contrast, if the packet is using, e.g., TCP protocol for Layer 4, the status of the TCP session might not have indicated any failures. For instance, the TCP handshake might have succeeded despite the failure of the server to establish the SSL connection. The failure of server 1 to establish the SSL connection would not have been detected without inspecting the information in the packet beyond Layer 4 (or transport layer) information.

As shown in FIG. 6B, the load balancer 415 sends a copy of a packet 635 to the DPI engine 480. The packet in this example is a response that server 2 has sent in response to a request by application 1. For instance, server 2 is another backend server to which application 1 is attempting to connect. As shown in the expanded view 640, the packet 635 includes an SSL connection status code 645 that indicates the connection has succeeded.

DPI engine 480 provides a feedback 650 to load balancer 415 that indicates (among others provided metrics) that the connection to server 2 has succeeded. Load balancer 415 receives the feedback 650 and performs different actions based on the provided metric. For instance, the load balancer updates (as shown by 655) the metrics for application 1 and server 2 in the application metrics storage 485. In addition, since the SSL connection between application 1 and server 2 has succeeded (e.g., using the same certificate that failed for server 1), the load balancer in this example concludes that the connection failure between server 1 and server 2 is indeed due to a failure of server 1. The load balancer, therefore, marks (as shown by 655) server 1 as failed.

Figure 7:
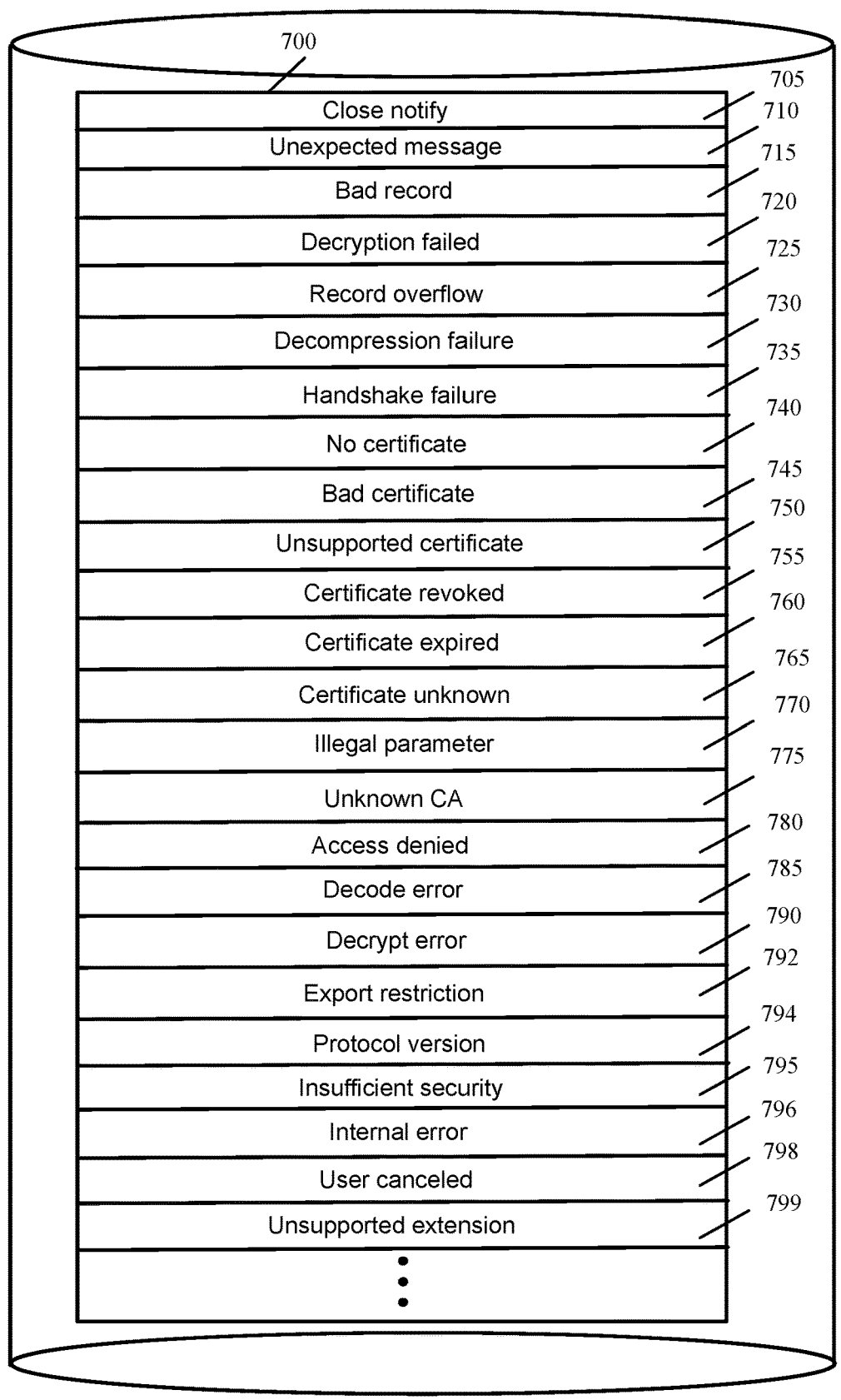
FIG. 7 conceptually illustrates metrics and/or alerts that a DPI engine provides to a load balancer for the SSL protocol.

FIGS. 6A and 6B describe one example of the inline health check that DPI engine performs to aid the load balancer. FIG. 7 conceptually illustrates further metrics and/or alerts that a DPI engine provides to a load balancer for the SSL protocol. As shown, the metrics and/or alerts 700 include close notify 705 (which indicates that the SSL connection is being closed), unexpected message 710, bad record 715, decryption failed 720, record overflow 725, decompression failure 730, and handshake failure 735.

The metrics and alerts further include several failure indications regarding the certificate including no certificate 740, bad certificate 745, unsupported certificate 750, certificate revoked 755, certificate expired 760, and certificate unknown 765. For instance, the failure status in the example of FIG. 6A may be related to one of the alerts 740-765 that reports different issues regarding a certificate.

The metrics and alerts also include illegal parameter 770, unknown certificate of authority (CA) 775, access denied 780, decode error 785, decrypt error 790, export restriction 792, protocol version 794, insufficient security 795, internal error 796, user canceled 78, unsupported extension 799, etc. In addition to individual metrics or alerts, the load balancer may maintain a count of different failures, number of times a certain connection is requested by different applications, etc.

A similar scenario can be made for doing a SQL call to a database server or a GET/PUT/Login operation from a file transfer protocol (FTP) server that is failing. Similarly, the DPI engine can look into other datacenter protocols such as virtual desktop infrastructure (VDI), PC over IP (PCoIP), etc., as well as SQL queries and provide automatic health and performance check. With this automatic discovery and health check of tiered applications, only the specific server that is misbehaving in an inner tier would get marked down, rather than the full pipeline.

Measuring the number of failed attempts to connect to an application can give statistics related to the application downtime. These failed attempts are discovered from the user traffic and do not require additional debug packets (e.g. a debug packet to check for a HTTP 200 OK response from the Application) to check application health. Similarly application response time can be measured by calculating the difference between a user request and an acknowledgement from the network traffic. This can give a measure of user experience. Thus the DPI gives a generic way to monitor application health and to collect application performance metrics and provide the collected metrics to a load balancer.

The DPI engine in some embodiments identifies authentication and version failures for protocols such as secure file transfer protocol (SFTP) and SQL. The health check performed by load balancers that utilize a DPI engine determine whether or not a full transaction has succeeded. In contrast, health check performed by prior art load balancers only determines application/server availability (e.g., by determining whether the server has responded or not based on actions such as a server response to a client hello, or a server request for authentication parameters).

Furthermore, automatic health checks in some embodiments is instantiated for certain protocols such as HTTP/HTTPS/FTP, which do not require a login on behalf of the client, by using the DPI engine to identify the protocol used. Additional metrics that identify the health status of an application such as the round trip response time of the application, the packet rate, the error rate, etc., are provided by the DPI engine to the load balancers.

The load balancers for a Hadoop system in some embodiments utilize a DPI engine to perform health check. A Hadoop system in some embodiments is used to implement distributed storage (Hadoop distributed file system) and distributed processing (Hadoop Map and Reduce) for very large data sets by using a cluster of servers. The servers can, e.g., be implemented on VMs running on one or more hosts or implemented on separate physical machines. In these embodiments, Hadoop error codes from the Map and Reduce clusters are determined and the load balancers remove nodes based on the error codes. The cluster management work, therefore, can be offloaded to the load balancers and DPI engine.

Additional applications of the load balancers that utilize a DPI engine include identifying errors on a distributed file system (e.g., for read/writes for syslog files). These distributed file systems are implemented in some embodiments as a load balanced cluster and the load balancers remove nodes based on the errors identified by the DPI engine. In general, any system that utilizes load balancers for one or more clusters of servers can utilize the disclosed DPI engine to assist the load balancers in identifying failed servers based on the information included in user traffic packets (i.e., packets that are not preconfigured and sent for the purpose of performing health check).

Figure 8:
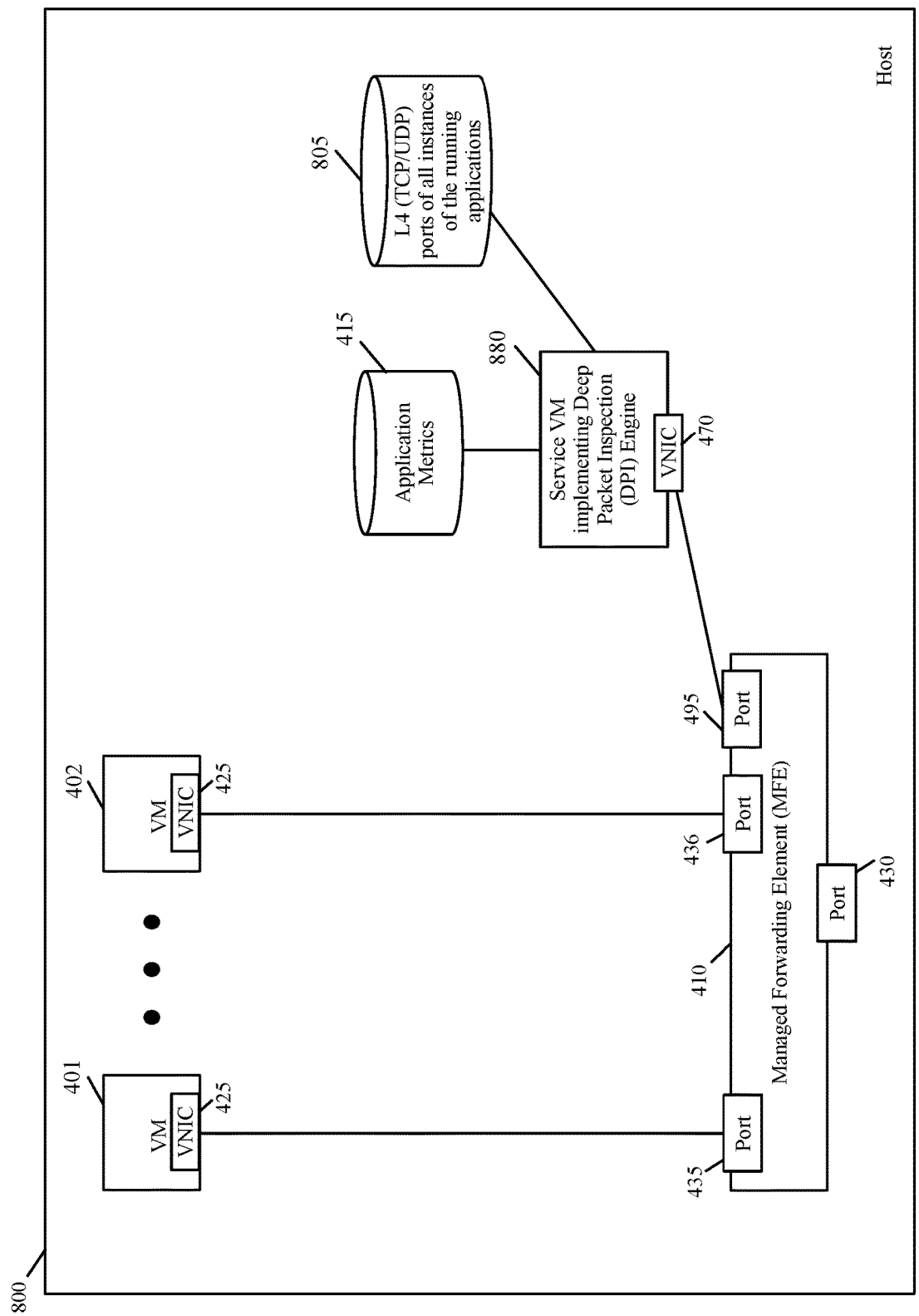
FIG. 8 conceptually illustrates a host that implements auto discovery and health check by using DPI in some embodiments.

C. Performing Deep Packet Inspection to Generate Metrics without using Load Balancers The embodiments described above utilize load balancers to send copies of a subset of user traffic packets to the DPI engine to generate metrics. In some alternative embodiments, the DPI engine is utilized to collect network metrics without the use of load balancers. FIG. 8 conceptually illustrates a host 800 that implements auto discovery and health check using DPI in some embodiments. As shown, the host 800 is hosting several VMs 401-402. Each VM can implement a server such as any of the webservers 310, application servers 315, and database servers 320 shown in FIG. 3. The host also includes a managed forwarding element (MFE) 410 and a deep packet inspection (DPI) engine (or deep packet inspector) 880. The MFE 410 and VMs 401-402 are similar to the MFE and VMs described above by reference to FIG. 4. Similar to the DPI engine discussed above, the DPI engine in FIG. 8 can be either implemented to run on a service VM (as shown) or to run as a process that runs on the host operating system.

In the example of FIG. 8, all L4 ports (i.e., TCP or UDP ports) of all instances of an application to be monitored are identified and stored in storage 805. Any packet traffic to and from these ports are intercepted by the DPI engine 880 and analyzed to provide metrics for the particular application that is utilizing the ports. In this example, instead of deep packet inspection beyond L4 layer, the DPI engine prepares performance metrics for the L4 layer of the application. For instance, the DPI engine collects metrics such the size of the TCP receive window, the round trip response time of the application, the packet rate, the error rate, etc., and stores the metrics in storage 415. One of the differences between the embodiment of FIG. 8 and the prior art system shown in FIGS. 1 and 2 is that the embodiment of FIG. 8 utilizes a generic DPI engine that performs health check for any application without writing application-specific health check scripts or adding agents or code to each application that is going to be monitored.

D. Processes Performed for Deep Packet Inspection

Figure 9:
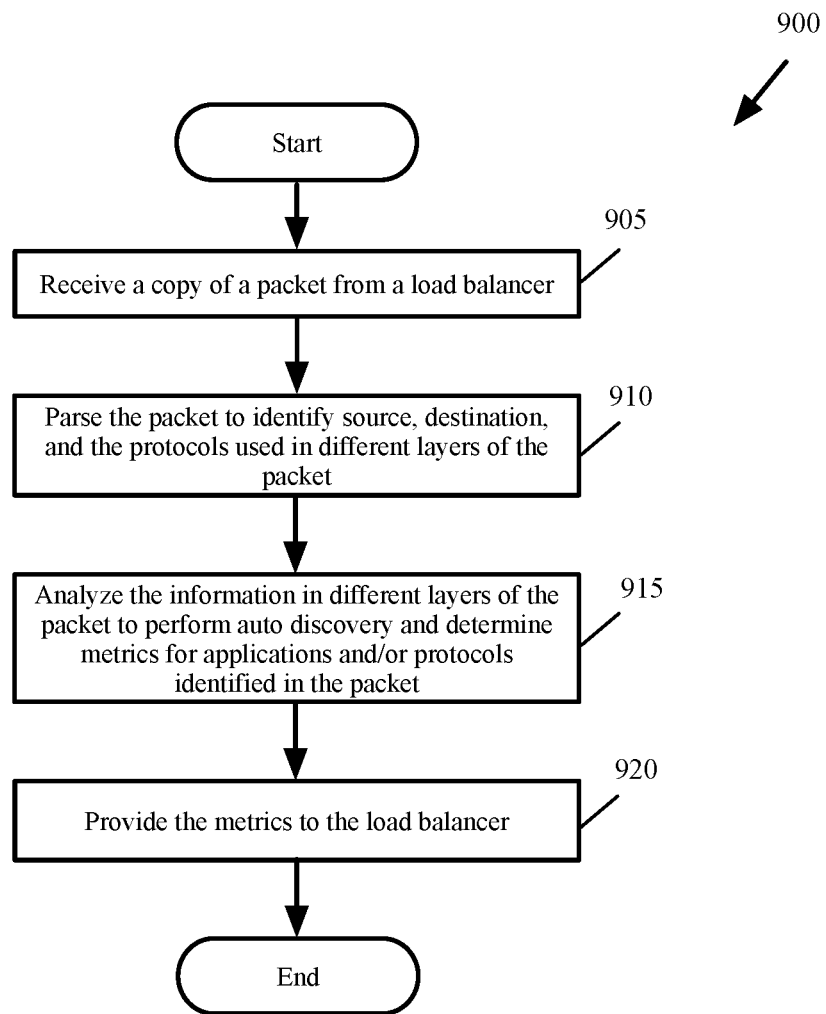
FIG. 9 conceptually illustrates a process for performing DPI on packets received from a load balancer in some embodiments.

FIG. 9 conceptually illustrates a process 900 for performing DPI on packets received from a load balancer in some embodiments. The process in some embodiments is performed by a DPI engine such as DPI engine 480 in FIG. 4.

As shown, the process receives (at 905) a copy of a packet from a load balancer. For instance, a load balancer (such as load balancer 415 in FIGS. 4 and 6A-6B) receives a packet (such as packets 605 or 635 in FIGS. 6A and 6B) at port 435 (shown in FIG. 4) and sends a copy of the packet to the DPI engine for deep packet inspection.

The process then parses (at 910) the packet to identify source, destination, and the protocols used in different layers of the packet. For instance, the process may determine a packet (such as packet 500 in FIG. 5) uses Ethernet protocol in layer 2, IP protocol in later 3, UDP protocol in layer 4, SSL protocol for providing security, and HTTP in layer 7. The DPI engine may also parse the headers at each layer to identify the source and destination of the packet. The DPI engine may also parse the packet to identify different status codes embedded in different fields of the packet.

The process then analyzes (at 915) the information extracted from different layers of the packet to determine application and/or protocol metrics. For instance, the process may inspect a status code (such as status codes 615 or 645 in FIGS. 6A-6B) to determine whether or not an attempt to make an SSL connection has been successful. The process may inspect other fields in the packet to collect other alerts or statistics for the packet. For instance, if one of the protocols used in the packet is SSL, the process may determine whether metrics or alerts such as layer 7 (L7) transactions per second, number of reads/writes per second, total number of sessions, or any of the metrics or alerts shown in FIG. 7 can also be harvested.

The process then provides (at 920) the metrics that include statistics and/or alerts harvested from the packet to the load balancer. For instance, the process provides feedback 620 or 650 shown in FIGS. 6A-6B to the load balancer. The process then ends.

Figure 10:
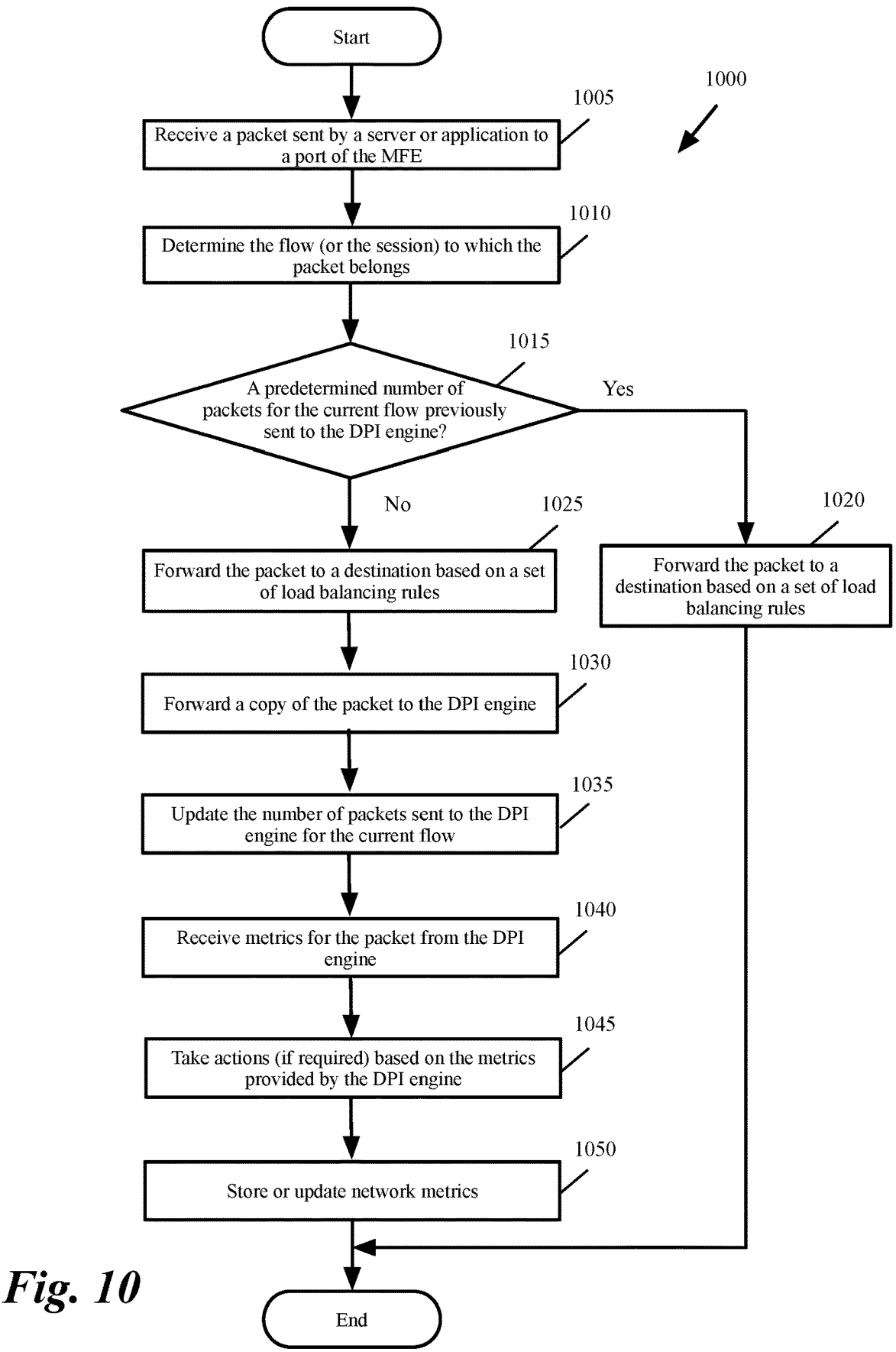
FIG. 10 conceptually illustrates a process for forwarding packets to the DPI engine and receiving metrics from the DPI engine in some embodiments.

FIG. 10 conceptually illustrates a process 1000 for forwarding packets to the DPI engine and receiving metrics from the DPI engine in some embodiments. The process in some embodiments is performed by a load balancer such as load balancer 415 in FIG. 4. As shown, the process receives (at 1005) a packet that is sent by a server or an application to a port of the MFE. For instance, the packet may by sent by a VM such as VM 401 in FIG. 4 that is performing as an application server. The process receives this packet at port 435 of MFE 410. The port software, e.g., makes a call to load balancer 410 to provide the packet to the load balancer. As another example, the packet may by sent from a server or application outside the host 400 and received at port 430 of the MFE. Again, the load balancer receives a copy of the packet form the port software.

The process then determines (at 1010) the stream (or session) to which the packet belongs. In some embodiments, each load balancer saves the identification of the ongoing sessions and uses the identifications to determine the session to which each packet belongs. The process then determines (at 1015) whether a predetermined number of packets for the same stream have been previously provided to the DPI engine. For instance, the process may only send copies of a predetermined number of packets (e.g., the first n packets in each stream) for each stream to the DPI and once the predetermine number of packets are sent to the DPI engine no further packets for that stream are sent to the DPI engine in order to save processing time and/or bandwidth.

If a predetermined number of packets for the current stream are not sent to the DPI engine, the process proceeds to 1025, which is described below. Otherwise, the process foregoes sending a copy of the packet to the DPI engine and only forwards (at 1020) the packet to a destination based on a set of load balancing rules. Each load balancer in some embodiments utilizes a set of load balancing rules to forward the workload to destinations. The process then ends.

When a predetermined number of packets for the current stream are not sent to the DPI engine, the process forwards a copy of the packet to the DPI engine in addition to forwarding the packet to a destination. Specifically, the process forwards (at 1025) the packet to a destination based on a set of load balancing rules. The process also forwards (at 1030) a copy of the packet to the DPI engine. For instance, the process forwards a copy 605 or 635 of the packet from the load balancer 415 to the DPI engine 480 as shown in FIGS. 6A-6B.

The process then updates (at 1035) the number of packets that are sent to the DPI engine for the current stream. The process utilizes this number to determine whether copies of future packets for the same stream have to be sent to the DPI engine (as described above by reference to operation 1015). The process then receives (at 1040) metrics for the packet from the DPI engine. For instance, the process receives the feedback packets 620 or 650 from the DPI engine 480 at the load balancer 415 as shown in FIGS. 6A-6B.

The process then takes actions (at 1045) based on the metrics provided by the DPI engine. For instance, the process may mark a server as failed or reset the status of a server as operational based on the statistics and alerts included in the metrics. The process then stores or updates (at 1050) the network metrics based on the metrics received from the DPI engine. For instance, the process stores the updated metrics in storage 485 as shown in FIG. 4. The process also optionally provides these metrics to a centralized controller to make cluster management decisions such as adding or consolidating the servers in the pool, etc. The process then ends.

Figure 11:
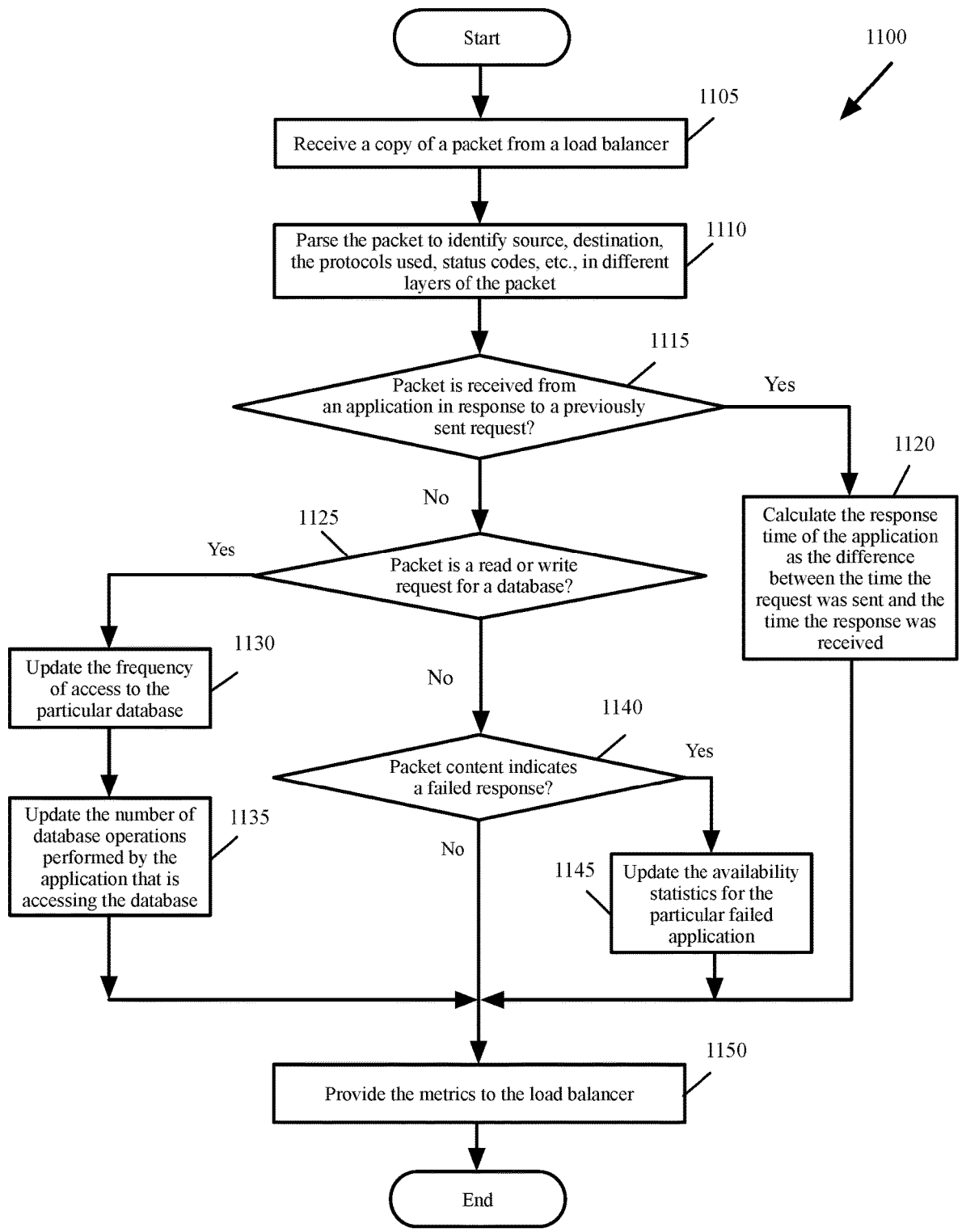
FIG. 11 conceptually illustrates examples of metrics that a DPI engine generates for different protocols or applications in some embodiments.

FIG. 11 conceptually illustrates examples of metrics that a DPI engine generates for different protocols or applications in some embodiments. The process is performed by the DPI engine in some embodiments. As shown, the process receives (at 1105) a copy of a packet from a load balancer. For instance, a load balancer (such as load balancer 415 in FIGS. 4 and 6A-6B) receives a packet (such as packets 605 or 635 in FIGS. 6A and 6B) at port 435 (shown in FIG. 4) and sends a copy of the packet to the DPI engine for deep packet inspection.

The process then parses (at 1110) the packet to identify source, destination, the protocols used, status codes, etc., in different layers of the packet. The process then determines (at 1115) whether the packet is received from an application in response to a previously sent request. For instance, the process determines that the packet belongs to the same stream (or session) as a previously sent request. If not, the process proceeds to 1125, which is described below.

Otherwise, the process calculates (at 1120) the response time of the application as the difference between the time the request was sent and the time the response was received. The process then proceeds to 1150, which is described below. The process determines (at 1125) whether the packet is a read or write request for a database. If not, the process proceeds to 1140, which is described below.

Otherwise, the process updates (at 1130) the frequency of access to the particular database. The process also updates (at 1135) the number of database operations performed by the application that is accessing the database. For instance, the process performs DPI to identify the application that requested the read or write operation. Alternatively, the process includes in the metrics provided to the load balancer the fact that a particular database is accessed by the application and the load balancer updates the metrics stored in metrics storage (e.g., storage 485 in FIG. 4). The process then proceeds to 1150, which is described below.

The process determines (at 1140) whether the packet content indicates a failed response. For instance, the process inspects status codes returned in different layers of the packet (e.g., the status codes 615 and 645 shown in FIG. 6). If yes, the process updates (at 1145) the availability statistics for the application. Or alternatively, the process includes in the metrics provided to the load balancer the availability (of lack thereof) of the application and the load balancer updates the metrics stored in metrics storage (e.g., storage 485 in FIG. 4).

The process then provides (at 1150) the collected metrics to the load balancer. The process then ends. It should be understood that the metrics described by reference to FIG. 11 are just examples of different metrics that the DPI engine collects in some embodiments. In addition, depending on the specific protocols used in a packet and the specific applications or servers that are the source or destination of a packet, some or all of the metrics shown in FIG. 11 may be collected for a particular packet.

II. Performing Auto Discovery and Health Check for an Idle Network using Deep Packet Inspection The examples described above utilize the user traffic to provide auto discovery and health check for different servers and applications in a network. Some embodiments provide additional functionality to perform auto discovery and health check for an idle network or for an idle portion of a network. An idle network (or network portion) is a network that has no user traffic or has user traffic that is at or below a threshold (e.g., the traffic is at or below a predetermined packet rate). In these embodiments, the load balancer not only sends copies of packets from the live user traffic but also stores a subset of these packets and reuses the packets to perform specific auto discovery and health check functions on an idle portion of the network.

Figure 12:
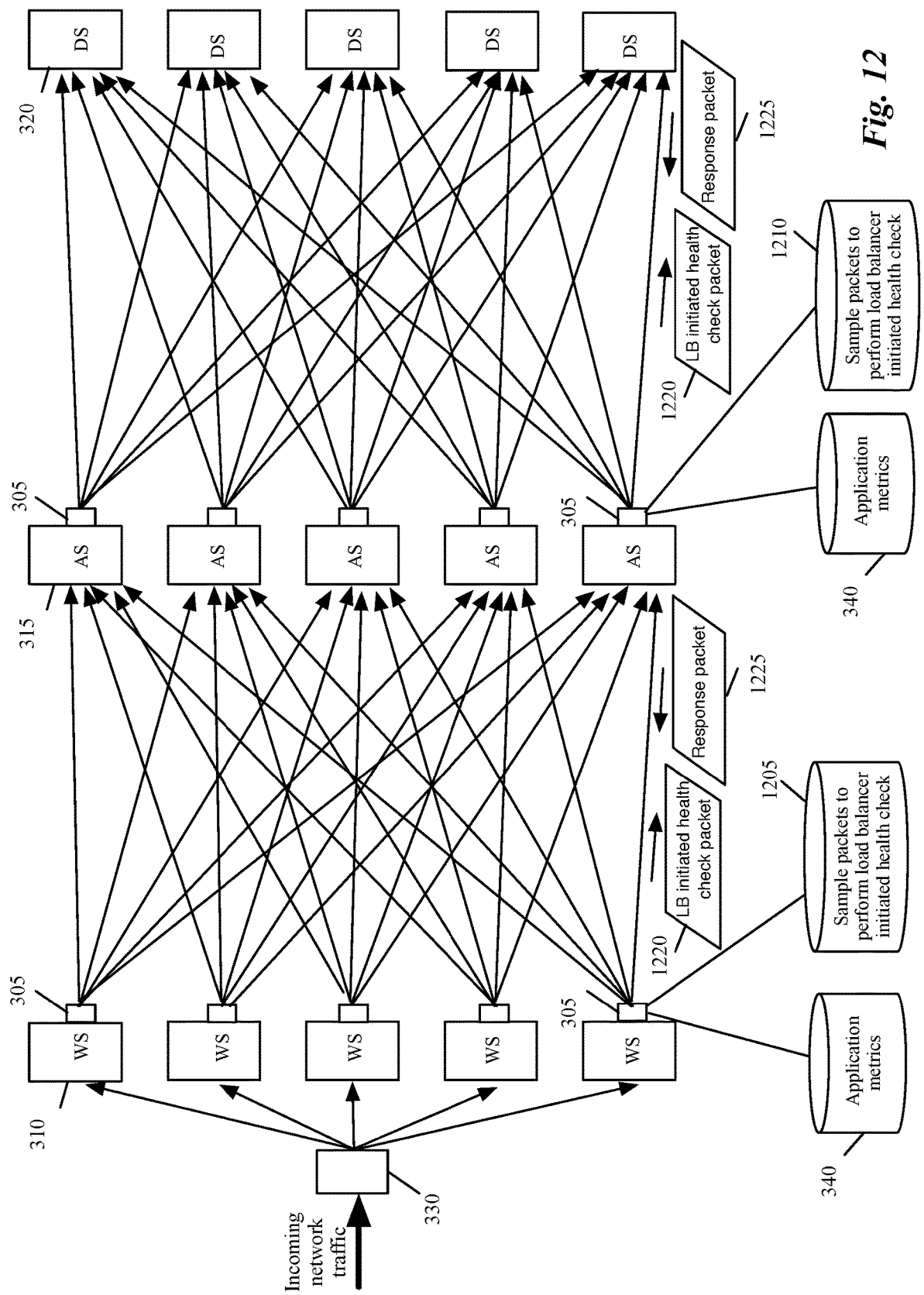
FIG. 12 conceptually illustrates a DPI based load balancer system with in-band auto discovery and health check in some embodiments.

FIG. 12 conceptually illustrates a DPI based load balancer system with in-band auto discovery and health check in some embodiments. The architecture shown in the FIG. 12 is similar to the architecture of FIG. 3. In the embodiment of FIG. 12, the load balancers 305 save a copy of a selected number of packets to perform health check operations. The packets in some embodiments are identified by the DPI engine as candidate packets for certain kind of health checks. In other embodiments, the load balancer selects the packets based on the metrics provided by the DPI engine.

As shown, the load balancers 305 save a set of packets in storage 1205 to perform load balancer initiated health check. For instance, the packets may include packets that access certain tables or data structures in a database to perform health check on a database server. The packets may also include different requests to be sent to webservers, application servers, or database servers to trigger expected results. The load balancers 305 send packets 1220 to certain servers and receive response 1225. The load balancer compares the response with an expected response to determine the health of the responding server. A lack of response may be determined as a failure of the server.

Any system that utilizes load balancers for one or more clusters of servers can utilize the disclosed DPI engine to assist the load balancers in identifying failed servers in an idle network based on the information included in packets that were selected and stored from the user traffic (i.e., packets that are not preconfigured for the purpose of performing health check).

Figure 13A:
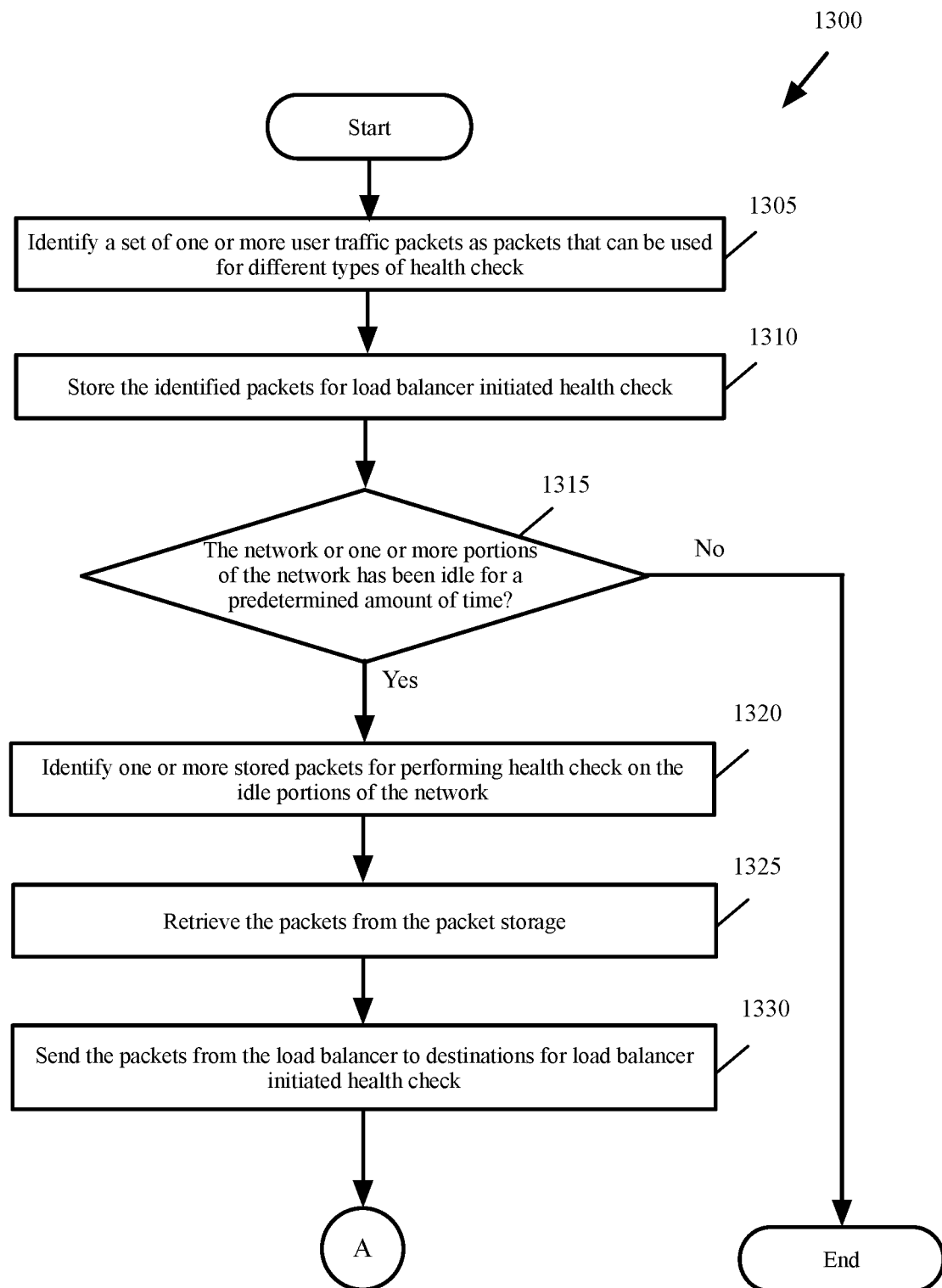
FIGS. 13A and 13B conceptually illustrate a process for performing load balancer initiated health check in some embodiments.
Figure 13B:
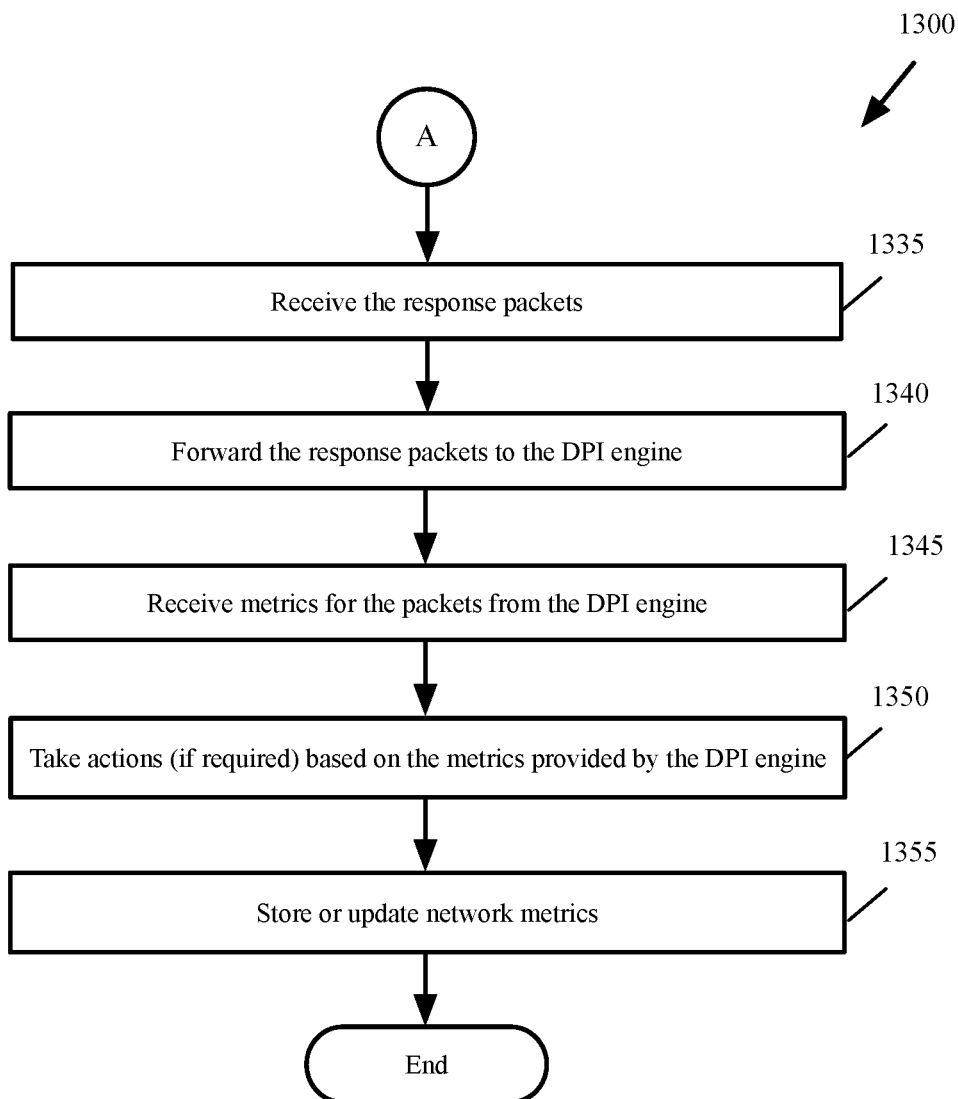

FIGS. 13A and 13B conceptually illustrate a process 1300 for performing load balancer initiated health check in some embodiments. The process in some embodiments is performed by a load balancer such as any of the load balancers 305 shown in FIG. 12. As shown, the process identifies (at 1305) a set of one or more user traffic packets as packets that can be used for different types of health check. For instance, the process identifies the packets based on the metrics provided by the DPI engine to the load balancer. In some embodiments, the packets are identified by the load balancer while in other embodiments the DPI engine identifies and recommends the packets to the load balancer. Some embodiments only utilize packets that do not update or change the system. In these embodiments, process 1300 only selects packets that fetch information from the system.

The process then stores (at 1310) the identified packets for load balancer initiated health check. For instance, the process stores the packets in storage 1205 shown in FIG. 12. The process then determines (at 1315) whether the network or one or more portions of the networks (e.g., one or more servers in the network) has been idle for a predetermined amount of time. The network (or a portion thereof) is considered idle if no packets or fewer packets that a predetermined number of packets are received in a predetermined amount of time.

When the network or no portion of the network is idle, the process ends. Otherwise, the process identifies (at 1320) one or more stored packets for performing health check on the idle network (or the idle portions of the network). For instance, if a certain database server has been idle, the process identifies one or more packets to access certain tables or data structures in a database provided by the server. On the other hand, when a webserver has been idle, the process may identify one or more packets that request access to a particular web page or request a particular file from the webserver. Similarly, if an application server has been idle, the process may identify one or more packets that request a service provided by the application.

The process then retrieves (at 1325) the identified packets from storage. For instance the process retrieves the packets form one of storages 1205 in FIG. 12. The process then sends (at 1330) the packets from the load balancer to destinations indicated in the packets for load balancer initiated health check.

Next, the process receives (at 1335) the response packets. A lack of response after a predetermined amount of time is an indication of the failure of the server from which a response is expected. The process then forwards (at 1340) the response packets to the DPI engine. For instance, the process sends the response packets from the load balancer 415 to DPI engine 480 in FIG. 4. The process then receives (at 1345) metrics for the packets from the DPI engine.

The process then takes actions (at 1350) based on the metrics provided by the DPI engine. For instance, the process may mark a server as failed or reset the status of a server as operational based on the statistics and alerts included in the metrics. The process then stores or updates (at 1355) the network metrics based on the metrics received from the DPI engine. For instance, the process stores the updated metrics in storage 485 as shown in FIG. 4. The process then ends.

II. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 14:
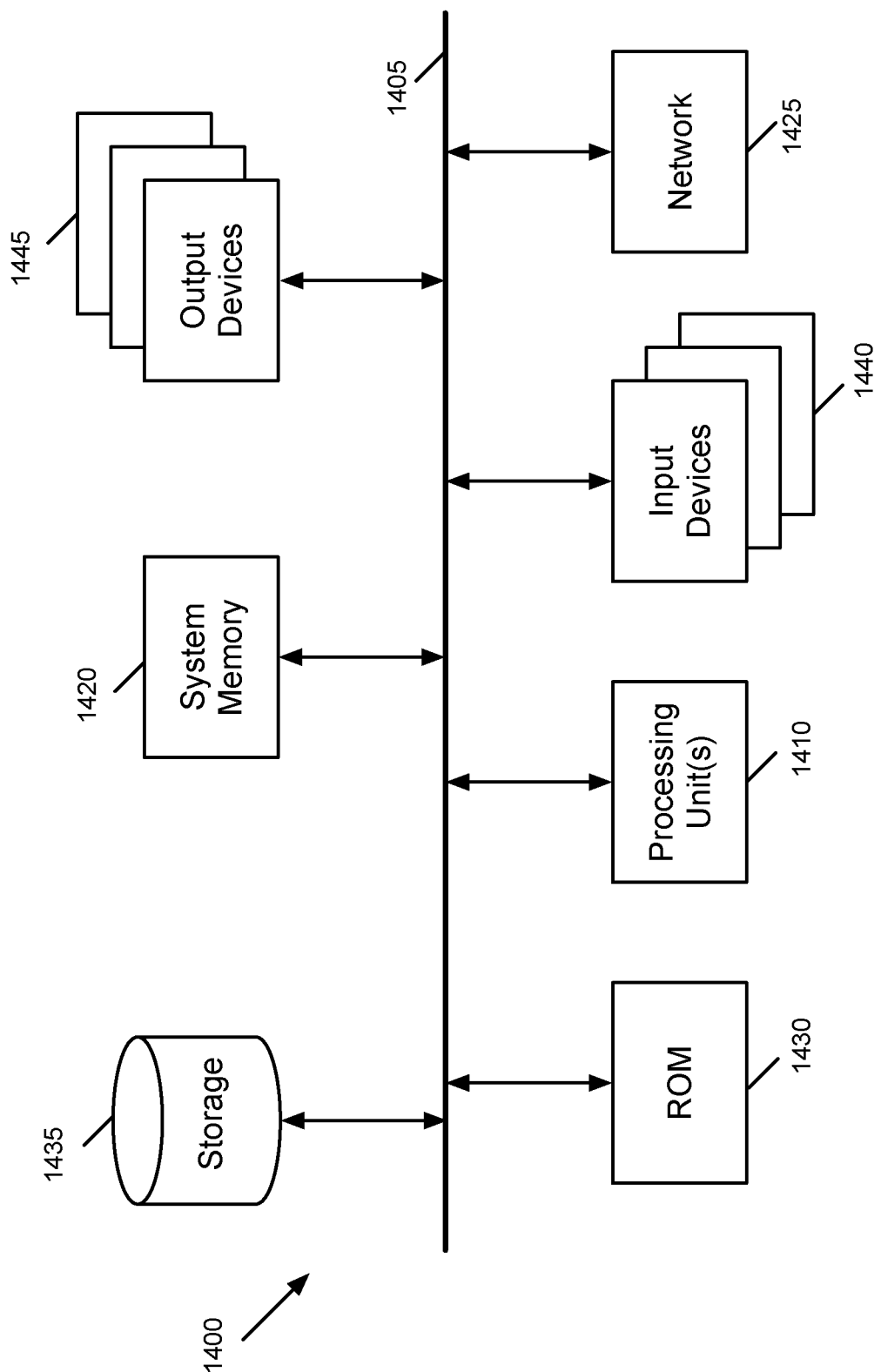
FIG. 14 conceptually illustrates an electronic system with which some embodiments of the invention are implemented.

FIG. 14 conceptually illustrates an electronic system 1400 with which some embodiments of the invention are implemented. The electronic system 1400 can be used to execute any of the control, virtualization, or operating system applications described above. The electronic system 1400 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1400 includes a bus 1405, processing unit(s) 1410, a system memory 1420, a read-only memory (ROM) 1430, a permanent storage device 1435, input devices 1440, and output devices 1445.

The bus 1405 collectively represents all system, peripheral, and chipset buses that communicatively connect the numerous internal devices of the electronic system 1400. For instance, the bus 1405 communicatively connects the processing unit(s) 1410 with the read-only memory 1430, the system memory 1420, and the permanent storage device 1435.

From these various memory units, the processing unit(s) 1410 retrieve instructions to execute and data to process in order to execute the processes of the invention. The processing unit(s) may be a single processor or a multi-core processor in different embodiments.

The read-only-memory 1430 stores static data and instructions that are needed by the processing unit(s) 1410 and other modules of the electronic system. The permanent storage device 1435, on the other hand, is a read-and-write memory device. This device is a non-volatile memory unit that stores instructions and data even when the electronic system 1400 is off. Some embodiments of the invention use a mass-storage device (such as a magnetic or optical disk and its corresponding disk drive) as the permanent storage device 1435.

Other embodiments use a removable storage device (such as a floppy disk, flash drive, etc.) as the permanent storage device. Like the permanent storage device 1435, the system memory 1420 is a read-and-write memory device. However, unlike storage device 1435, the system memory is a volatile read-and-write memory, such as random access memory. The system memory stores some of the instructions and data that the processor needs at runtime. In some embodiments, the invention's processes are stored in the system memory 1420, the permanent storage device 1435, and/or the read-only memory 1430. From these various memory units, the processing unit(s) 1410 retrieve instructions to execute and data to process in order to execute the processes of some embodiments.

The bus 1405 also connects to the input and output devices 1440 and 1445. The input devices enable the user to communicate information and select commands to the electronic system. The input devices 1440 include alphanumeric keyboards and pointing devices (also called "cursor control devices"). The output devices 1445 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 14, bus 1405 also couples electronic system 1400 to a network 1425 through a network adapter (not shown). In this manner, the computer can be a part of a network of computers (such as a local area network ("LAN"), a wide area network ("WAN"), or an Intranet, or a network of networks, such as the Internet. Any or all components of electronic system 1400 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. In addition, a number of the figures (including FIGS. 9-11 and 13A-13B) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface module, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

One of ordinary skill in the art will recognize that while the specification refers to VMs, the examples given could be any type of DCNs, including physical hosts, VMs, non-VM containers, and hypervisor kernel network interface modules. In fact, the example networks could include combinations of different types of DCNs in some embodiments.

In view of the foregoing, one of ordinary skill in the art would understand that the invention is not to be limited by the foregoing illustrative details, but rather is to be defined by the appended claims.

What is claimed is:

1. A method of adjusting load balancing in a network, the method comprising:
    at a deep packet inspector executing on a physical host in a datacenter:
        receiving from a load balancer executing on the physical host a copy of a network packet copied at the load balancer, the packet comprising a plurality of layers, each layer corresponding to a communication protocol in a plurality of communication protocols;
        identifying an application that was a source of the packet;
        analyzing the information above a transport layer of the packet to compute a response time of the application that is longer than a first particular threshold value; and
        sending the calculated response time to the load balancer to reduce future communications between the load balancer and the identified application.

2. The method of claim 1, wherein the identified application is provided by one of a webserver, an application server, and a database server.

3. The method of claim 1, wherein analyzing the information comprises computing one of a frequency of access to a database and a number of database operations performed by the identified application that is below a second particular threshold value.

4. The method of claim 1, wherein analyzing the information comprises determining an indication that the identified application has failed based on a status code identified in a packet layer over a transport layer of the packet.

5. The method of claim 1 further comprising:
    identifying one or more protocols used in one or more layers of the packet; and
    analyzing the information in one or more layers of the packet to determine metrics for the identified protocols.

6. A non-transitory machine readable medium storing a program for adjusting load balancing in a network, the program executable by a processing unit, the program comprising sets of instructions for:
    at a deep packet inspector executing on a physical host in a datacenter:
        receiving from a load balancer executing on the physical host a copy of a network packet copied at the load balancer, the packet comprising a plurality of layers, each layer corresponding to a communication protocol in a plurality of communication protocols;
        identifying an application that was a source of the packet;
        analyzing the information above a transport layer of the packet to compute a response time of the application that is longer than a first particular threshold value; and
        sending the calculated response time determined health check metrics to the load balancer to initiate sending a health-check message to the identified application.

7. The non-transitory machine readable medium of claim 6, wherein the identified application is provided by one of a webserver, an application server, and a database server.

8. The non-transitory machine readable medium of claim 6, wherein analyzing the information comprises computing one of a frequency of access to a database and a number of database operations performed by the identified application that is below a second particular threshold value.

9. The non-transitory machine readable medium of claim 6, the program further comprising sets of instructions for:
    identifying one or more protocols used in one or more layers of the packet; and
    analyzing the information in one or more layers of the packet to determine metrics for the identified protocols.

10. A system comprising:
    a set of processing units; and
    a non-transitory machine readable medium storing a program for adjusting load balancing in a network, the program executable by a processing unit in the set of processing units, the program comprising sets of instructions for:
        at a deep packet inspector executing on a physical host in a datacenter:
            receiving from a load balancer executing on the physical host a copy of a network packet copied at the load balancer, the packet comprising a plurality of layers, each layer corresponding to a communication protocol in a plurality of communication protocols;

identifying an application that was a source of the packet;

analyzing the information above a transport layer of the packet to compute a response time of the application that is longer than a first particular threshold value; and sending the calculated response time to the load balancer to reduce future communications between the load balancer and the identified application.

11. The system of claim 10, wherein the identified application is provided by one of a webserver, an application server, and a database server.

12. The system of claim 10, wherein analyzing the information comprises computing one of a frequency of access to a database and a number of database operations performed by the identified application that is below a second particular threshold value.

13. The system of claim 10, wherein analyzing the information comprises determining an indication that the identified application has failed based on a status code identified in a packet layer over a transport layer of the packet.

14. The system of claim 10, the program further comprising sets of instructions for:

identifying one or more protocols used in one or more layers of the packet; and analyzing the information in one or more layers of the packet to determine metrics for the identified protocols.

15. The method of claim 1, wherein reducing future communications with the identified application comprises one of marking the identified application as failed and marking a server on which the application executes as failed.

16. The method of claim 1, wherein the application executes on a server that is part of a cluster of servers that execute the same application, and wherein reducing future communications with the identified application comprises terminating communications with the identified application and directing subsequent communications to another application executing on another server.

17. The method of claim 1, wherein the response time of the application that is longer than the first particular threshold value is an indication that the application has failed.

18. The method of claim 1, wherein the response time comprises an indication that a connection attempt with the application has failed.

* * * * *